(12) United States Patent
Kawata

(10) Patent No.: US 8,713,205 B2
(45) Date of Patent: Apr. 29, 2014

(54) DATA TRANSFER DEVICE AND DATA TRANSFER METHOD

(75) Inventor: Atsushi Kawata, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 362 days.

(21) Appl. No.: 12/623,827

(22) Filed: Nov. 23, 2009

(65) Prior Publication Data

US 2010/0131677 A1    May 27, 2010

(30) Foreign Application Priority Data

Nov. 27, 2008   (JP) ................................. 2008-302905

(51) Int. Cl.
*G06F 3/00*     (2006.01)
(52) U.S. Cl.
USPC ................................................ 710/6; 710/40
(58) Field of Classification Search
USPC .................................... 710/40, 116
See application file for complete search history.

(56) References Cited

U.S. PATENT DOCUMENTS

| | | | | |
|---|---|---|---|---|
| 6,505,265 | B1 * | 1/2003 | Ishikawa et al. | 710/113 |
| 6,516,369 | B1 * | 2/2003 | Bredin | 710/111 |
| 7,080,177 | B2 * | 7/2006 | Neuman | 710/240 |
| 7,689,781 | B2 * | 3/2010 | De Perthuis et al. | 711/151 |
| 8,065,447 | B2 * | 11/2011 | Ryu et al. | 710/22 |
| 8,171,187 | B2 * | 5/2012 | Rozen et al. | 710/40 |
| 2008/0049029 | A1 * | 2/2008 | Kurata et al. | 345/519 |
| 2010/0023653 | A1 * | 1/2010 | Rozen et al. | 710/28 |

FOREIGN PATENT DOCUMENTS

| | | |
|---|---|---|
| JP | 5-151156 | 6/1993 |
| JP | 2000-259548 | 9/2000 |
| JP | 2002-229934 | 8/2002 |
| JP | 2005-158127 | 6/2005 |
| JP | 2006-172395 | 6/2006 |
| JP | 2007-228145 | 9/2007 |
| JP | 4136347 | 6/2008 |
| JP | 2008-234189 | 10/2008 |
| JP | 2009-217640 | 9/2009 |

\* cited by examiner

*Primary Examiner* — Ernest Unelus
(74) *Attorney, Agent, or Firm* — Cooper & Dunham LLP

(57) ABSTRACT

A disclosed data transfer device includes one or more data transfer control unit configured to control a command issuance and a data transfer separately, a command issuing unit configured to determine priorities of commands and issue the commands in an order from a higher priority, a memory communication control unit configured to perform the data transfer corresponding to the command from and to a memory, and a signal output unit configured to output a completion signal of the data transfer in a case where the data transfer is normally completed. The command issuing unit sets a priority of a command corresponding to a request for resetting the data transfer control unit lower than the priority of the command issued by the data transfer control unit when the request for resetting is received, and the signal output unit outputs a dummy completion signal to the memory communication control unit.

17 Claims, 13 Drawing Sheets

DATA TRANSFER DEVICE AND DATA TRANSFER METHOD

BACKGROUND OF THE INVENTION

1. Field of the Invention

The present invention generally relates to a data transfer device and a data transfer method.

2. Description of the Related Art

Conventionally, a technique of separating phases of command and data and first sending a command in the phase of command has been researched as in Japanese Unexamined Patent Application Publication No. 2005-1518127. In case where a data transfer device includes a plurality of direct memory access controllers (DMACs) having functions as in the Japanese Unexamined Patent Application Publication No. 2005-1518127, and sends data to and receives data from a dynamic random access memory controller (DRAMC) through an arbitration by an arbiter, when if a certain DMAC causes a failure there is a need for resetting only the DMAC having the failure instead of resetting the entire data transfer device.

Meanwhile, in Japanese Unexamined Patent Application Publication No. Hei. 5-151156, there is disclosed a conventional technique of stopping an operation after completion of arbitration or a selection and preventing a stop while a connection with the other party is bad.

However, there is a problem that a data transfer in a data transfer device cannot be continued in its entirety even though a DMAC, which first sends a command as in the Japanese Unexamined Patent Application Publication No. 2005-1518127, is controlled to prevent a reset as in Japanese Unexamined Patent Application Publication No. Hei. 5-151156.

Hereinafter, the problem will be explained. First, an example of timing chart of "READ" between a DMAC first sending a command and an arbiter will be explained. FIG. 1 shows an example of a timing chart between a DMAC and an arbiter.

A DRAMC asserts a command acknowledgement (com_ack) through the arbiter upon receipt of a command request (com_req) by the DMAC. Next, the DRAMC outputs a read data to the DMAC through the arbiter, and the DMAC receives the read data by asserting a data acknowledgement (data_ack).

Next, an example of timing chart in "READ" between the arbiter and the DRAMC. FIG. 2 shows an example of timing chart between the arbiter and the DRAMC. The arbiter issues a command to the DRAMC after allocating tags to respective DMACs in order for identifying which DMAC it is. Next, the DRAMC returns one of the tags to the arbiter in a data phase, and the arbiter allocates the read data to the DMAC in reference to one of the tags.

Next, a timing chart of the above problem will be explained. FIG. 3 shows an example of a timing chart of a discontinuous data transfer. When a reset is requested after the DMAC issues the command, the DMAC thus reset cannot respond to a request in a data phase from the DRAMC, thereby causing a problem that the DRAMC is waiting for response. State differently, when a DRAM which has issued a command in a duration between a command phase and a data phase is reset, the data transfer device falls into a state in which overall data transfers cannot be continue.

SUMMARY OF THE INVENTION

Accordingly, embodiments of the present invention may provide a novel and useful data transfer device including plural data transfer control units controlling a command issuance and a data transfer separately and enabling, even after resetting one of the data transfer control units, to continue a data transfer without affecting the other data transfer control units and a data transfer method thereof, the data transfer device and method solving one or more of the problems discussed above.

One aspect of the embodiments of the present invention may be to provide a data transfer device including a data transfer control unit configured to control a command issuance and a data transfer separately, a command issuing unit configured to determine priorities of commands and issue the command in an order from a higher priority, a memory communication control unit configured to carry out the data transfer corresponding to the command thus issued from the command issuing unit from and to a memory, and a signal output unit configured to output a completion signal indicative of a completion of the data transfer by the data transfer control unit in response to a request for the data transfer from the memory communication control unit in a case where the data transfer is normally completed, wherein the command issuing unit sets a priority of a command corresponding to the request for resetting the data transfer control unit lower than the priority of the command issued by the data transfer control unit when the request for resetting is received, and the signal output unit outputs a dummy completion signal to the memory communication control unit as a response signal in response to the data transfer request by the data transfer control unit subject to the request for resetting.

A second aspect of the embodiments of the present invention may be to provide a data transfer method in a data transfer control unit including one or more data transfer control units configured to control a command issuance and a data transfer separately, a command issuing unit configured to determine priorities of commands and issue the commands in an order from a higher priority, a memory communication control unit configured to carry out the data transfer corresponding to the commands thus issued from the command issuing unit from and to a memory, and a signal output unit configured to output a completion signal indicative of a completion of the data transfer with the data transfer control unit in response to a request for the data transfer from the memory communication control unit in a case where the data transfer is normally completed, the data transfer method including setting with the command issuing unit to lower the priority of a command corresponding to the request for resetting the data transfer control unit than the priority of the command issued by the data transfer control unit when the request for resetting is received, and outputting with the signal output unit a dummy completion signal to the memory communication control unit as a response signal in response to the data transfer request by the data transfer control unit subject to the request for resetting.

According to embodiments of the present invention, in a data transfer device including plural data transfer control units configured to control a command issuance and a data transfer separately, when one of the data transfer units is reset, the data transfer can be continued without affecting the other data transfer units.

Additional objects and advantages of the embodiments will be set forth in part in the description which follows, and in part will be obvious from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

DETAILED DESCRIPTION OF THE PREFERRED EMBODIMENTS

A description is given below, with reference to the FIG. 4 through FIG. 13 of embodiments of the present invention.

Embodiment 1

<Circuit Configuration>

Figure 1:
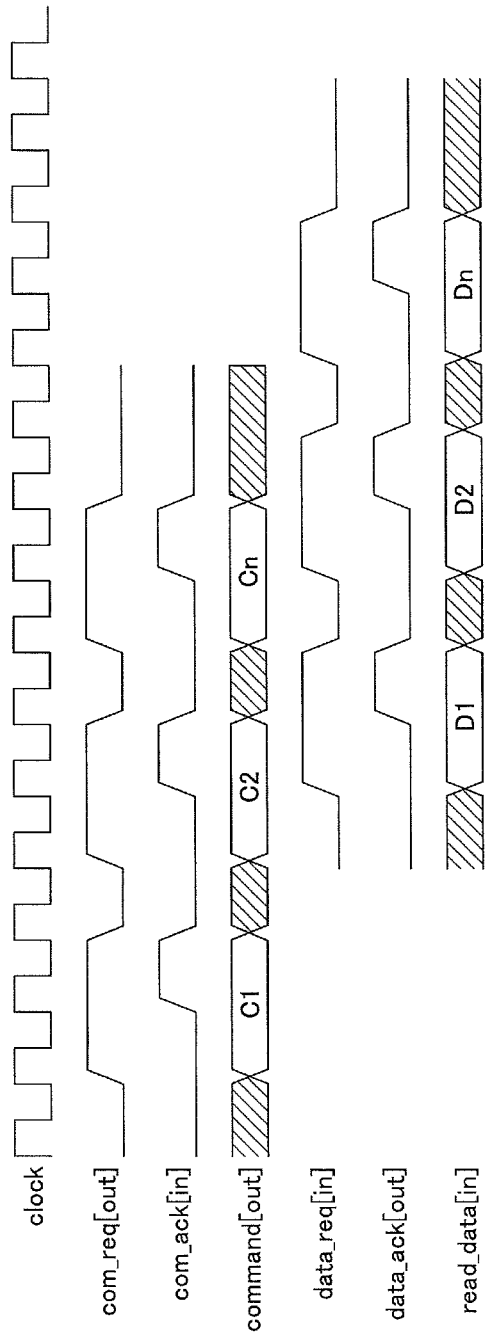
FIG. 1 shows an example of a timing chart between a DMAC and an arbiter.
Figure 2:
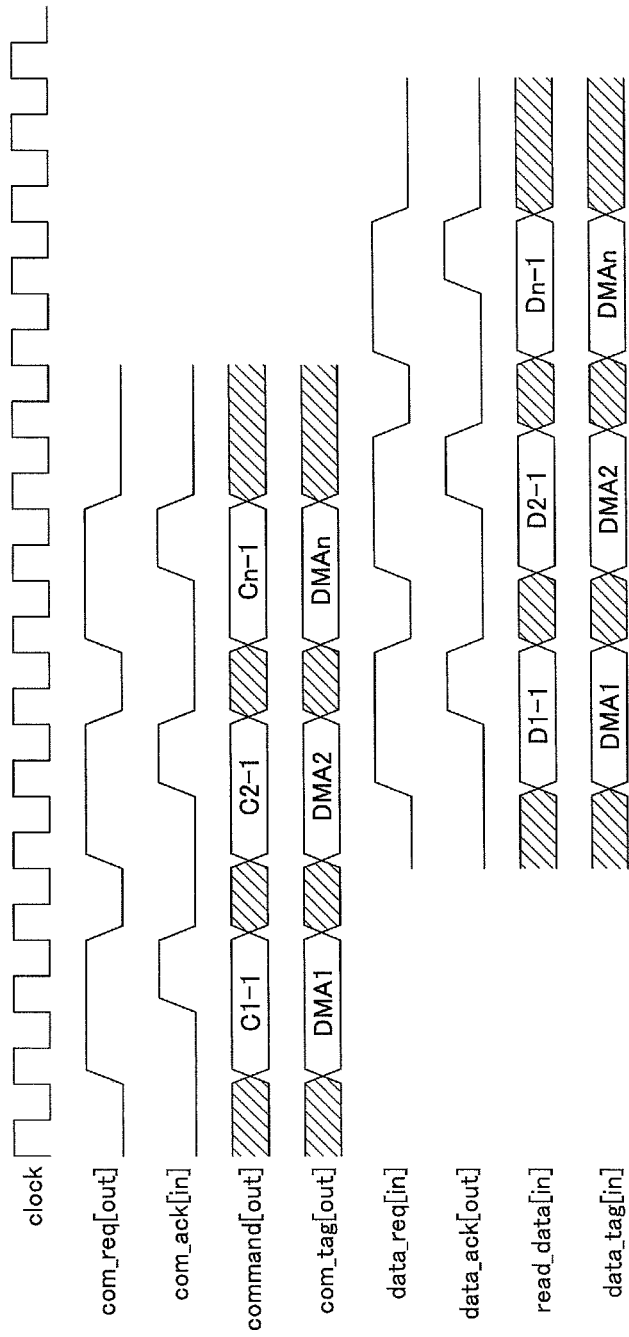
FIG. 2 shows an example of a timing chart between an arbiter and a DRAMC.
Figure 3:
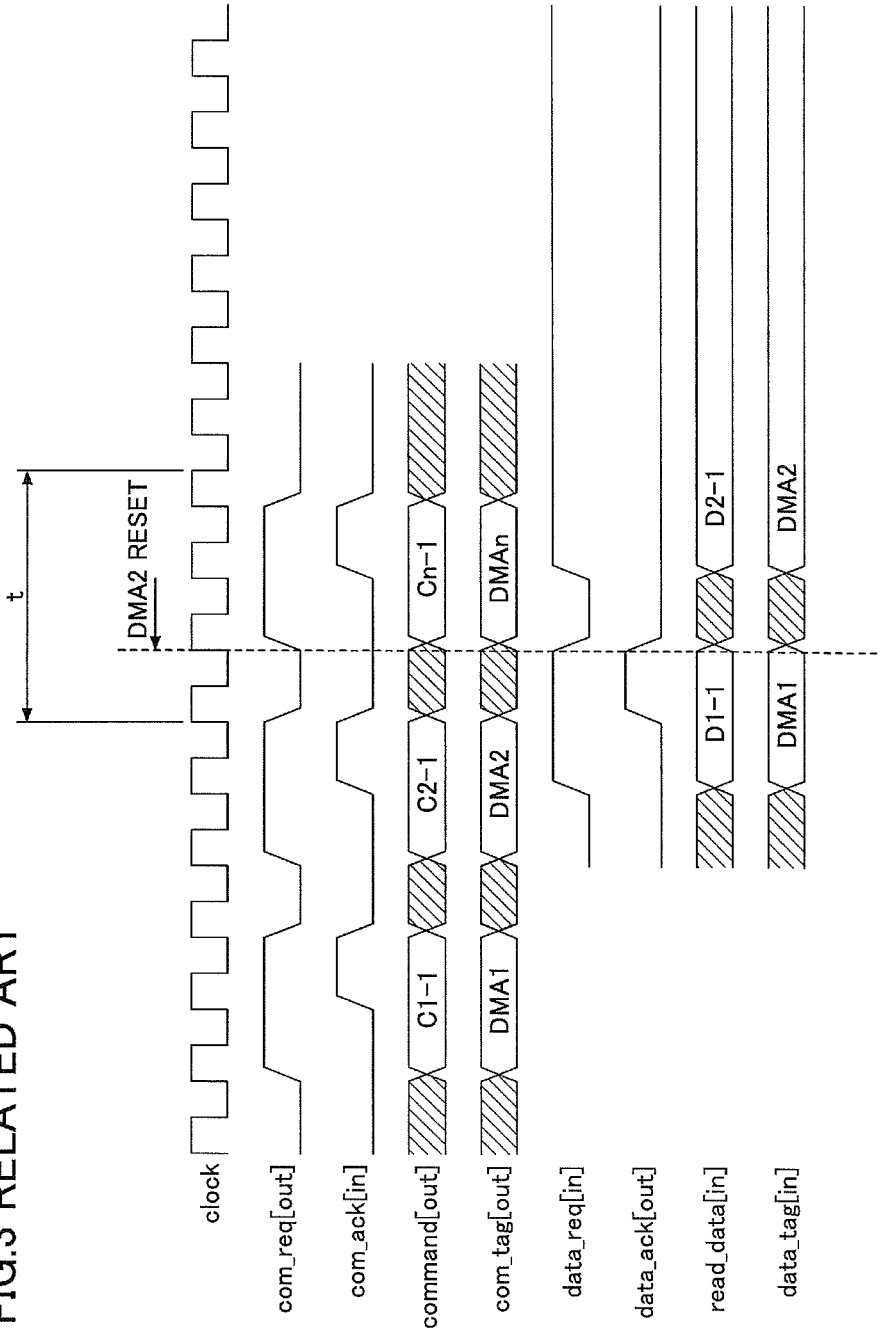
FIG. 3 shows an example of a timing chart of a discontinuous data transfer.
Figure 4:
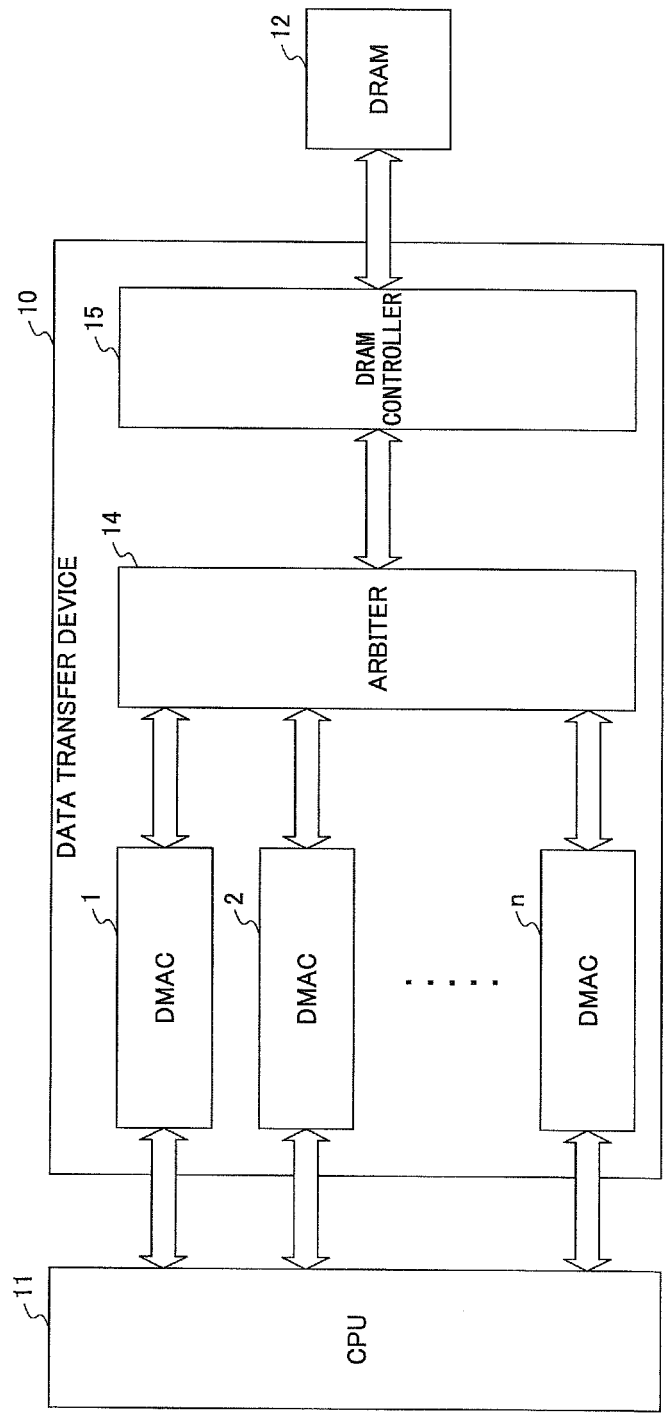
FIG. 4 shows a circuit configuration example of a data transfer device according to an embodiment of the present invention.

FIG. 4 shows a circuit configuration of a data transfer device according to an embodiment of the present invention. Referring to FIG. 4, the data transfer device 10 includes direct memory access controllers (DMACs) 1 to n, an arbiter 14, and a dynamic random memory access controller (DRAMC) 15.

The DMACs 1 to n are connected to a central processing unit (CPU) 11, thereby being enabled to directly access a memory area inside the CPU 11, read data, and write the data. Because every DMAC 1 to n can control a command issuance and a data transfer separately, it is possible for every DMAC 1 to n to first send a command to the arbiter 14 and to later transfer data.

The CPU 11 connected to the DMACs 1 to n is not necessarily a central processing unit (CPU) and may be a communication interface such as a universal serial bus (USB). Although the DMAC is explained as an example of a data transfer control unit, the present embodiment is not so limited and a device which can control a command issuance and a data transfer separately may be used.

The arbiter 14 receives commands from the DMACs 1 to n, and determines priorities of the commands thus received. Further, the arbiter 14 allocates a tag indicating from which DMAC the command is received to the command thus received and sends the tag to the DRAMC. The arbiter 14 outputs a completion signal (an ack signal) indicating that the data are received (data_ack) when the data are received. A detailed explanation of the arbiter 14 will be given with reference to FIG. 5.

The DRAMC 15 is connected between the arbiter 14 and the DRAM 12 and carries out a data transfer of the command thus received. Further, the DRAMC 15 writes data into the DRAM 12 and reads data from the DRAM 12.

The DRAM 12 is not limited to a dynamic random access memory (DRAM) and it is sufficient to have a memory area. Similarly, the DRAMC 15 is not limited to a DRAMC and may be a memory controller (memory communication control unit) for controlling data communications with a memory.

Figure 5:
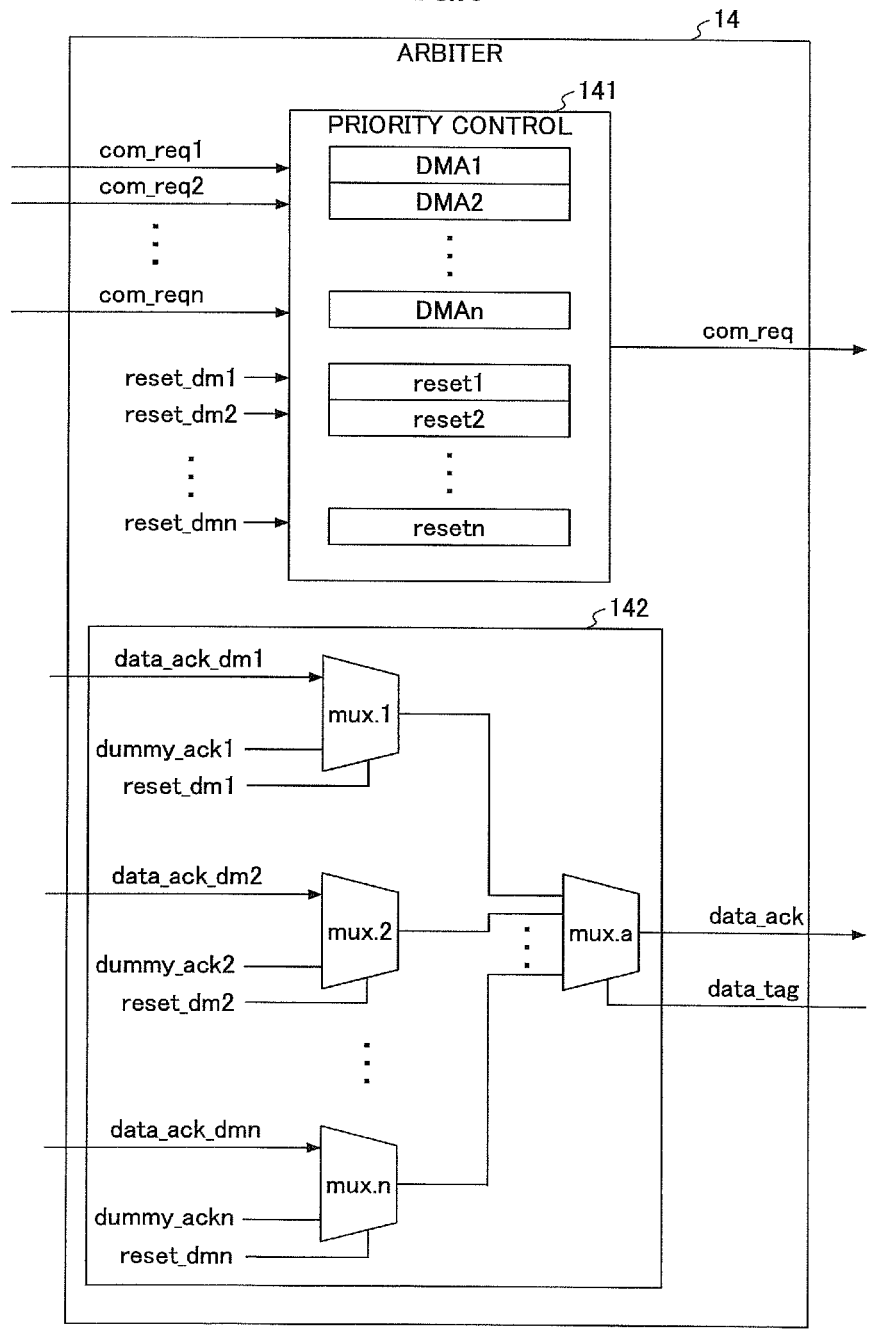
FIG. 5 shows a circuit configuration example of an arbiter 14.

Next, the arbiter 14 will be explained. FIG. 5 shows a circuit configuration example of the arbiter 14. Referring to FIG. 5, the arbiter 14 includes a command issuing part 141 and a data receipt control part 142.

The command issuing part 141 receives respective command requests (com_req*(*=1, 2, ..., n)) from the DMACs 1 to n, chooses one of the requests after determining the priorities of the commands, and issues the command (com_req) to the DRAMC 15. At this time, a tag (com_tag) indicating from which DMAC the command comes is allocated to the command. A method of determining the priorities of the commands is, for example, round-robin processing. However, the method is not so limited.

Further, the command issuing part 141 controls the commands corresponding to requests for respectively resetting the DMACs 1 to n by determining priorities of the commands. The priorities of the commands corresponding to the requests for resetting are controlled to be lower than the priorities of the commands issued by the DMACs 1 to n. Therefore, the command corresponding to the request for resetting is sent to the DRAMC 15 after all of the commands are issued by the DMACs 1 to n. Further, the priority of the command corresponding to the request for resetting may be lower than the priority of the command issued by the DMAC to which the request for resetting is issued.

Further, the command issuing part 141 issues a pseudo read command (a command corresponding to the request for resetting) when the DMAC, to which the request for resetting had been issued, has issued a read command (a request to read), and issues a pseudo write command when the above DMAC has issued a write command (a request to write).

The data receipt controlling part 142 controls to receive data by choosing a completion signal (data_ack_dm*(*=1, 2, ..., n) signal) indicating that data from the DMACs 1 to n are completely received and a dummy completion signal (dummy_ack*(*=1, 2, ..., n) signal) generated at a time of resetting inside the arbiter 14 upon receipt of requests for reset (reset_dm*(*=1, 2, ..., n)) from the DMACs 1 to n. Specifically, the dummy completion signal (dummy_ack* signal) is chosen when the request for resetting is issued, and the completion signal (data_ack_dm* signal) is chosen when the request for resetting is not issued.

Next, the data receipt controlling part 142 chooses the signals thus chosen by a tag (data_tag) returned by the DRAMC 15 and outputs the completion signal (data_ack signal) to the DRAMC 15.

<Major Functional Configuration>

Figure 6:
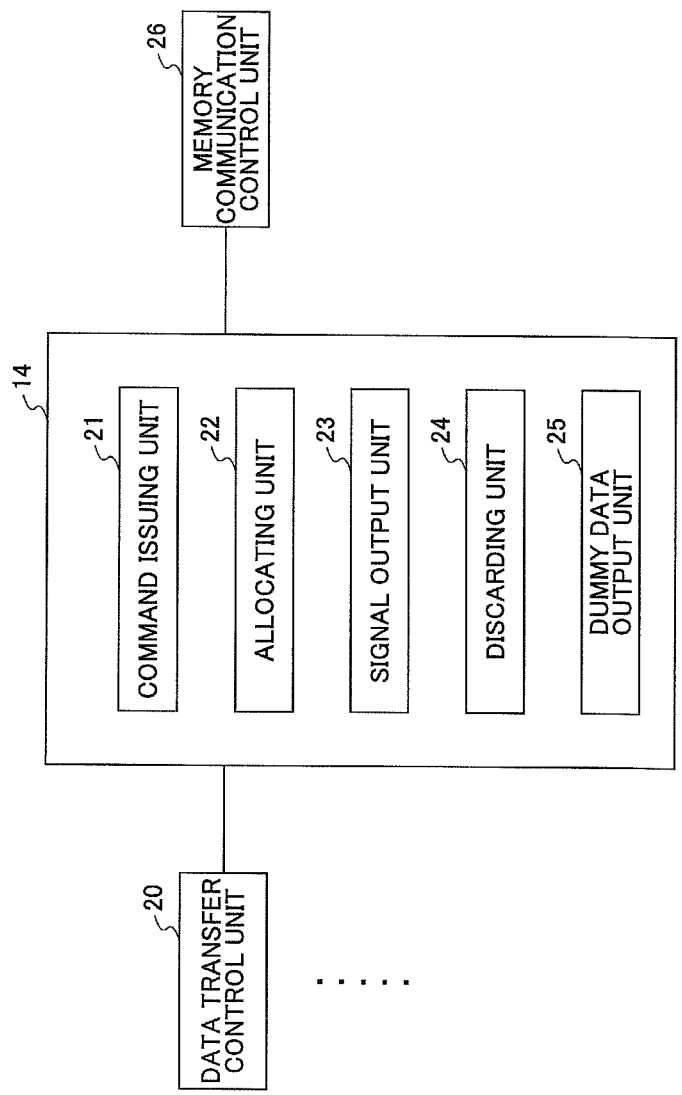
FIG. 6 shows an example of a functional configuration of a data transfer device 10.

Next, a major functional configuration of the data transfer device 10 will be explained. FIG. 6 shows an example of the major functional configuration of the data transfer device 10. As shown in FIG. 6, the data transfer device 10 includes a data transfer control unit 20 (DMAC), a memory communication control unit 26 (DRAMC), a command issuing unit 21 (a command issuing part 141) functioning inside the arbiter 14, an allocating unit 22, a signal output unit 23 (a data receipt controlling part 142), a discarding unit 24, a dummy data output unit 25 and so on. Because the data transfer control unit 20 and the memory communication control unit 26 respectively correspond to the DMACs 1 to n and the DRAMC 15, description of these are omitted.

Next, a major functional configuration inside the arbiter 14 will be explained. The command issuing unit 21 has a function similar to the command issuing unit 141 shown in FIG. 5 and receives commands from the DMACs 1 to n to thereby determine priorities of the commands and issues the commands to the memory communication control unit 26 in accordance with an order of the priorities.

Here, a priority of a command corresponding to the request for resetting is determined to be lower than the priorities of the commands issued by the DMACs 1 to n. Further, the priority of the command corresponding to the request for resetting may be lower than the priority of the command issued by the data transfer control unit 20 to which the request for resetting is issued.

Further, the priority of the command corresponding to the request for resetting may be controlled only when the data transfer in the entire data transfer device causes a problem. The problem occurs when the data transfer control unit is reset before a data transfer process of the data transfer control unit which has issued the command is completed.

In this case, it becomes impossible to output a response signal in response to the data transfer request from the memory communication control unit, which has received the command thus issued. The allocating unit 22 allocates a tag indicating from which DMAC the command is issued to the commands from the DMACs 1 to n. Further, the allocating unit 22 allocates reset tags to request resetting of the DMACs 1 to n.

The signal output unit 23 outputs a completion signal (data_ack signal) when the data transfer control unit 20 completes the data transfer in response to the data transfer request from the memory communication control unit 26. Further, a dummy completion signal (dummy_ack signal) is output to the data transfer control unit 20, to which the request for resetting (reset_dm) is issued, when there is a data transfer request from the memory communication control unit 26.

The discarding unit 24 discards data when a request for resetting is issued to the data transfer control unit 20 that has issued a read command because the data transfer control unit 20 cannot receive the data which has been read out. Specifically, the arbiter 14 discards the data received from the memory communication control unit 26 by asserting a dummy_ack signal.

The dummy data output unit 25 generates or prepares dummy data and outputs these to the memory communication control unit 26 when the request for resetting is issued to the data transfer control unit 20 which has issued a write command because the data transfer control unit 20 cannot output write data. The memory communication control unit 26 discards the dummy data after receiving the dummy data.

As for a process for resetting the data transfer control unit 20, a reset_dm signal subject to the request for resetting is negated when the arbiter 14 receives a reset tag returned from the memory communication control unit 26. By this, the process for resetting the data transfer control unit 20 is completed.

As described above, the arbiter 14 makes the priority of the request for resetting lower than the priorities of the commands when the request for resetting is issued to the data transfer control unit (DMAC), and outputs the dummy completion signal when the data transfer request is issued to the data transfer control unit to which the request for resetting is issued. Therefore, it is possible to output the response signal from the data transfer control unit subject to the request for resetting, thereby enabling to continue the data transfer without affecting the other data transfer control units.

The arbiter 14 can complete the process for resetting when the reset tag is returned from the memory communication control unit in a data phase by issuing the reset tag to the memory communication control unit (DRAMC) by allocating the reset tag to the command by the allocating unit 22.

The arbiter 14 can make the priority of the command corresponding to the request for resetting lower than the priority of the command issued by the data transfer control unit, to which the request for resetting is issued, to thereby complete the process for resetting after carrying out the command issued by the transfer control unit. By this, it is possible to shorten a time for completing the process for resetting in comparison with a case where the priority of the command corresponding to the request for resetting is set lower than the priorities of the commands issued by the data transfer control units.

<Process for Resetting During Request for Reading>

Figure 7:
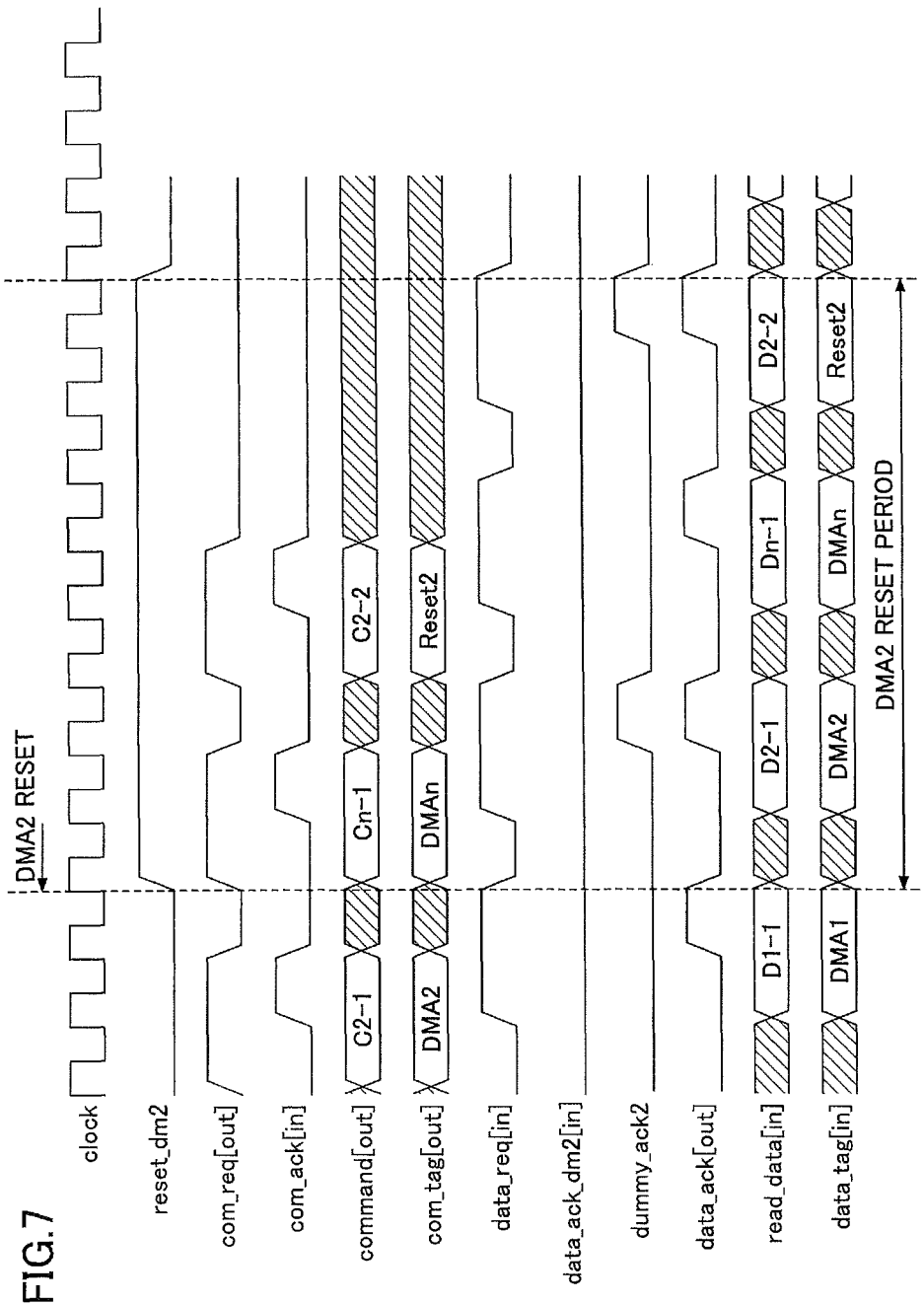
FIG. 7 shows an example of a timing chart in a case where a DMAC 2 is reset while a read request is issued to the DMAC 2.

Next an explanation is given to a case where the data transfer unit 10 is reset when a read request has been issued. FIG. 7 shows an example of a timing chart in a case where the DMAC 2 is reset while a read request is issued to the DMAC 2.

Referring to FIG. 7, when the DMAC 2 is reset, the reset_dm2 signal is asserted inside the arbiter 14. Although the DRAMC 15 inputs read_data="D2-1" in the data phase of the DMAC 2, the DMAC 2 cannot respond because it is reset (i.e. data_ack_dm2 remains "L").

Here, the dummy_ack2 signal is generated inside the arbiter 14 and the signal is output as the data_ack signal to the DRAMC 15. Therefore, the arbiter 14 can receive the data from the DRAMC 15 instead of the DMAC 2. Meanwhile, the data thus received is discarded because it is unnecessary.

Since the arbiter 14 can receive the data of the DMAC 2 by such a pseudo read, the communication in the other DMACs can be continued.

Further, the arbiter 14 adds a tag (com_tag) of Reset2 in response to the request for resetting the DMAC2 and issues a command (command=C2-2) in response to the read request to the DRAMC 15. Since the priority of the command is set lower than the priorities of the requests from the DMACs as described above, the command is issued after completing processes required by the DMACs.

Next, when the read data of the command or the reset tag (Reset2) is returned from the DRAMC 15 (read_data=D2-2), all the commands issued by the DMAC 2 are resultantly processed. Thus the process for resetting the DMAC 2 is completed (i.e. the reset_dm2 is negated).

As a result, in case where a command is a read command, it is possible to reset a DMAC subject to a request for resetting and continue the data transfer without affecting other DMACs.

Further, in the example shown in FIG. 7, although the priority of the command in response to the request for resetting is set lower than the priorities of the commands respectively issued by the DMACs, the present invention can be embodied when the priority of the command in response to the request for resetting is lower than the priority of the command issued by the DMAC (e.g. DMAC 2) subjected to the resetting.

In this case, it is possible to shorten a time for completing the process for resetting in comparison with a case where the priority of the command in response to the request for resetting is set lower than the priorities of the commands issued by the data transfer control units.

<Process for Resetting During Request for Writing>

Figure 8:
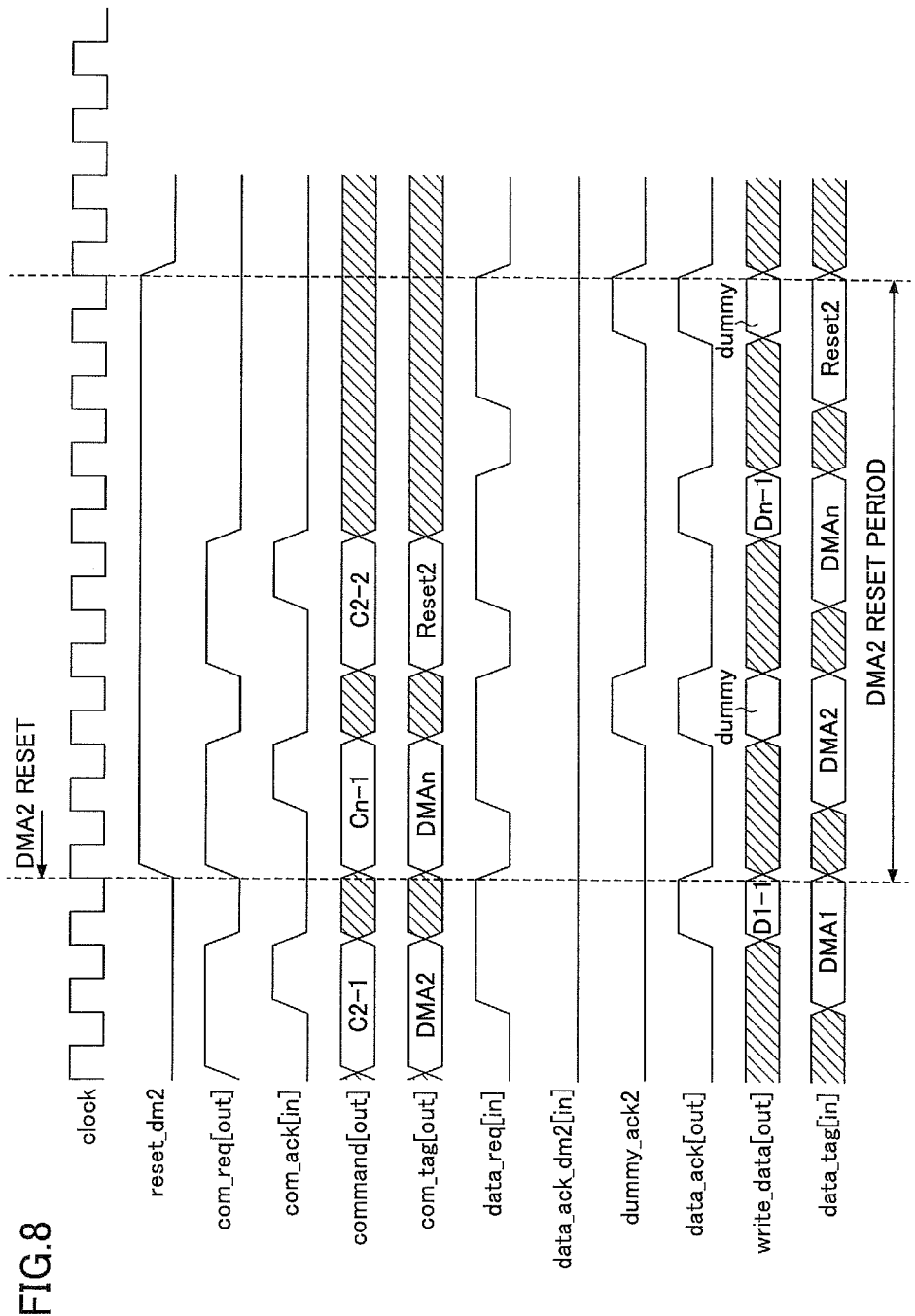
FIG. 8 shows an example of a timing chart in a case where a DMAC 2 is reset while a write request is issued to the DMAC 2.

Next an explanation is given to a case where the data transfer device 10 according to Embodiment 1 is reset when a write request has been issued. FIG. 8 shows an example of a timing chart in a case where the DMAC 2 is reset while a read request is issued to the DMAC 2.

Referring to FIG. 8, processes of a write request are basically similar to those of the read request. There will be described only differences from the read request. In a case where the command is a write request and the DMAC 2 is subject to resetting after the DMAC 2 issues a command in response to the write request, it is impossible to receive write data from the DMAC 2. Therefore, dummy data are generated or prepared to be output to the DRAMC 15.

As a result, in case where a command is a write command, it is possible to reset a DMAC subject to a request for resetting and continue data transfer without affecting the other DMACs.

<Operation>

Figure 9:
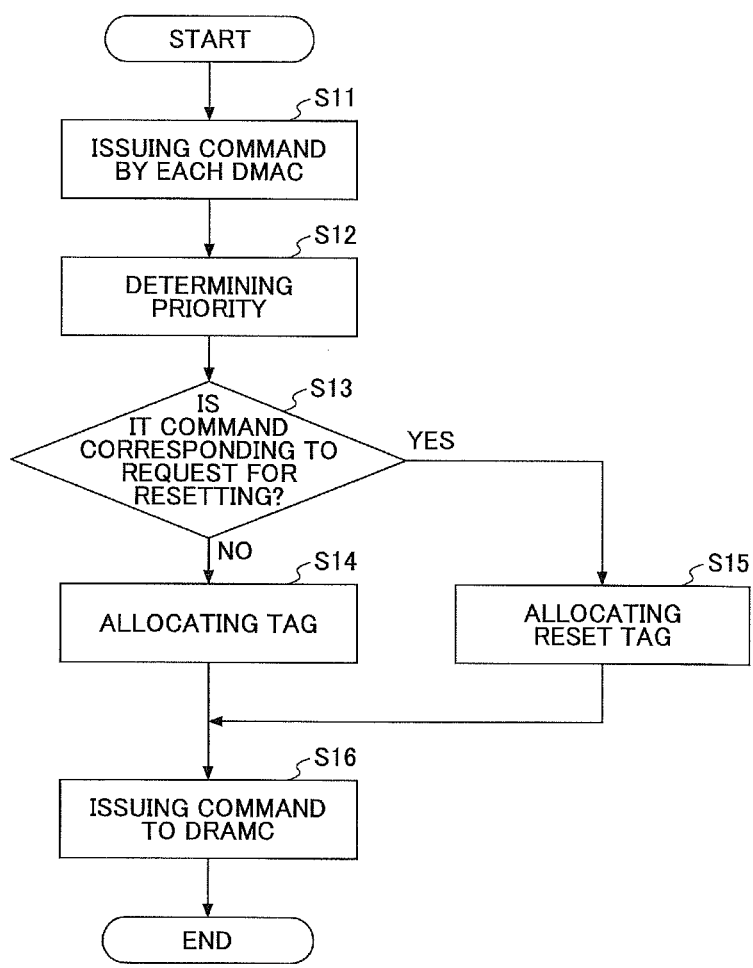
FIG. 9 is a flow diagram showing an example of a command issuing process by an arbiter 14.

Operation of the data transfer device 10 according to Embodiment 1 will be described. First, a command issuance by the arbiter 14 will be described. FIG. 9 is a flowchart showing an example of a command issuing process by the arbiter 14.

Commands are issued by DMACs 1 to n in step S11. In step S12, the arbiter 14 (a command issuing unit 21) receives the commands from the DMACs 1 to n. Then priorities of the commands thus received are determined, and the commands are issued to the DRAMC 15 in the order of highest priority. At this time, in a case where a request for resetting is issued to one or more of the DMACs 1 to n, priorities of one or more commands corresponding to the request for resetting are set lower than priorities of the commands issued by the DMACs 1 to n.

In step S13, it is determined by the arbiter 14 (an allocation unit 22) whether the command corresponds to the request for resetting with respect to each of the DMACs 1 to n. If a result of the determination in step S13 is NO (i.e. not the command corresponding to the request for resetting), the process goes to step S14. If the result is YES, the process goes to step S15. In step S14, the arbiter 14 (the allocating unit 22) allocates to one of the commands a tag that indicates the DMAC issuing the one of the commands. In step S15, the arbiter 14 (the allocating unit 22) allocates a reset tag to the command corresponding to the request for resetting.

In step S16, the arbiter 14 issues a command to the DRAMC 15 in accordance with the priorities.

Thus the priority of the command corresponding to the request for resetting is set lower than the priorities of the commands issued by the DMACs 1 to n, whereby it becomes possible to issue the command corresponding to the request for resetting after the DMACs issue the commands. Further, the priority of the command corresponding to the request for resetting may be set lower than the priority of the command issued by the DMAC to which the request for resetting is issued without setting the priority of the commands corresponding to the request for resetting lower than the priorities of all the commands issued by the DMACs 1 to n.

Figure 10:
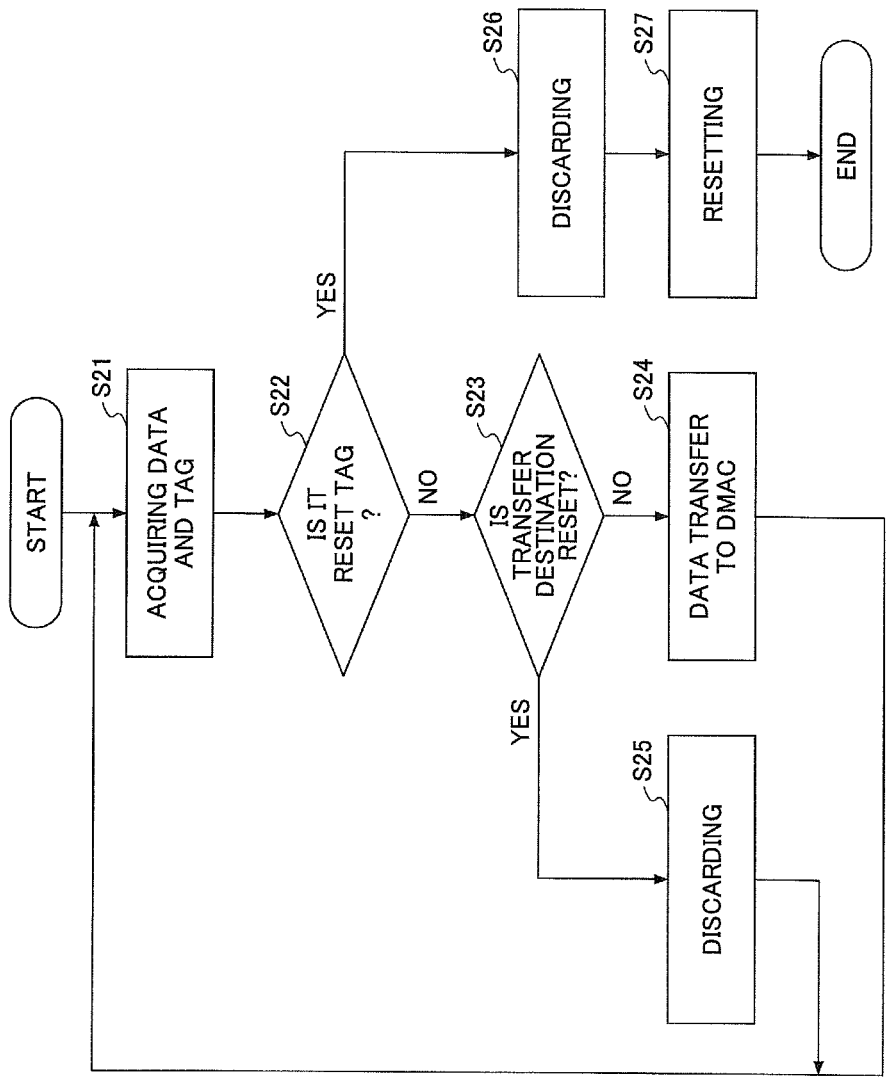
FIG. 10 shows an example of a data transfer process in response to a read request.

Next, a data transfer process by the arbiter 14 will be explained. FIG. 10 shows an example of the data transfer process in response to a read request. In step S21, the arbiter 14 acquires data and a tag from the DRAMC 15.

In step S22, the arbiter determines whether the tag thus acquired is a reset tag. When a result of the determination is YES (i.e. the tag thus acquired is a reset tag), the process goes to step S26. If the result is NO (i.e. the tag thus acquired is not a reset tag), the process goes to step S23.

Referring to step S23, the arbiter 14 determines whether a request for resetting is issued to the DMAC indicated by the tag. Specifically, it is possible to make a determination based on whether the reset_dm* signal in FIG. 7, is asserted. When a result of the determination in step S23 is YES (i.e. there is a request for resetting), the process goes to step S25. When the result is NO (i.e. there is not a request for resetting), the process goes to step S24.

When the arbiter 14 (the signal output unit 23) transfers data to the DMAC in step S24, the arbiter 14 acquires a data_ack_dm* signal from the DMAC and outputs a data_ack signal to the DRAMC 15.

In step S25, the arbiter 14 (the signal output unit 23) outputs a dummy_ack signal to the DRAMC 15 since the DMAC cannot output the data_ack_dm* signal and discards data read from the DRAM 12 with the discarding unit 24. After completing steps S24 and S25, the process goes back to step S21.

In step S26, in a manner similar to step S25, the arbiter 14 outputs the dummy_ack signal and discards the data read from the DRAM 12 with the discarding unit 24.

In step S27, the arbiter 14 resets the DMAC to which the request for resetting is issued. Specifically, by negating the reset_dm signal the process for resetting is completed.

As described above, even when the DMAC requesting to read is subject to resetting, it is possible to continue data transfers overall inside the device 10 without affecting the data transfer to the other DMACs.

Figure 11:
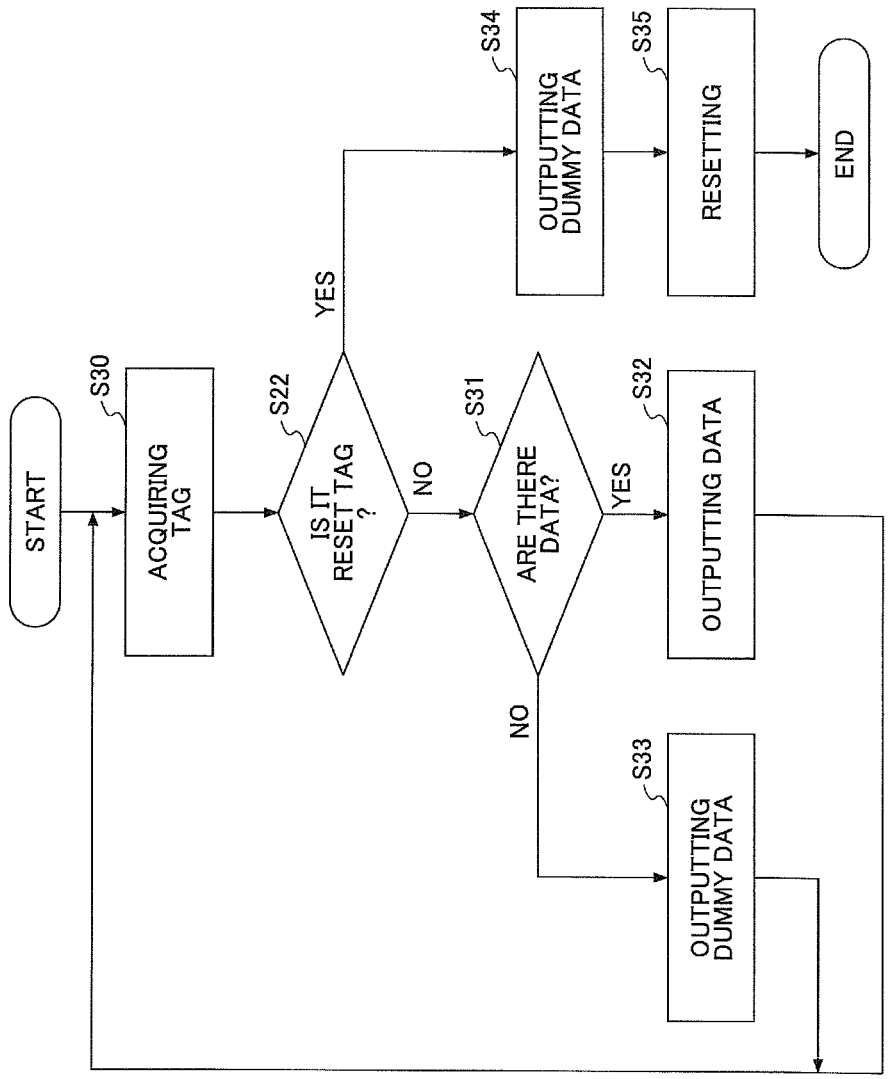
FIG. 11 shows an example of a data transfer process in response to a write request.

FIG. 11 is a flow diagram showing an example of the data transfer process in response to a write request. Referring to FIG. 11, the identical numerical references are used for processes similar to those in FIG. 10, and descriptions of the numerical references are omitted.

In step S30, the arbiter 14 acquires a tag from the DRAMC 15.

In step S31, it is determined whether the arbiter 14 acquires data for writing from the DMCA indicated by the tag to the DRAM 12. In a case where a result of the determination is YES (i.e. the data are acquired), the process goes to step S32. In case of NO (i.e. the data are not acquired), the process goes to step S33.

In step S32, the arbiter 14 outputs data acquired from the DMAC shown in the tag to the DRAMC 15. In step S32, since the data of the DMAC indicated by the tag do not exist because of the request for resetting, the arbiter 14 (the dummy data output unit 25) outputs the dummy data to the DRAMC 15.

After processing the steps S32 and S33, the process goes back to step S30. The dummy data thus output are discarded by the DRAMC 15.

In step S34, the arbiter 14 outputs dummy data to the DRAMC 15 when the reset tag is received from the DRAMC 15 in a manner similar to step S33.

In step S35, the arbiter 14 resets the DMAC to which the request for resetting is issued. Specifically, by negating the reset_dm signal the process for resetting is completed.

As described, according to the data transfer device according to Embodiment 1, a data transfer device having plural data transfer control units which control a command issuance and a data transfer separately can continue the data transfer even when one of the data transfer control units is subject to resetting without affecting the other data transfer control units.

Embodiment 2

A data transfer device according to Embodiment 2 is different from that of the Embodiment 1 in that DMACs are grouped and subject to resetting group by group.

<Major Circuit Configuration of Arbiter>

Figure 12:
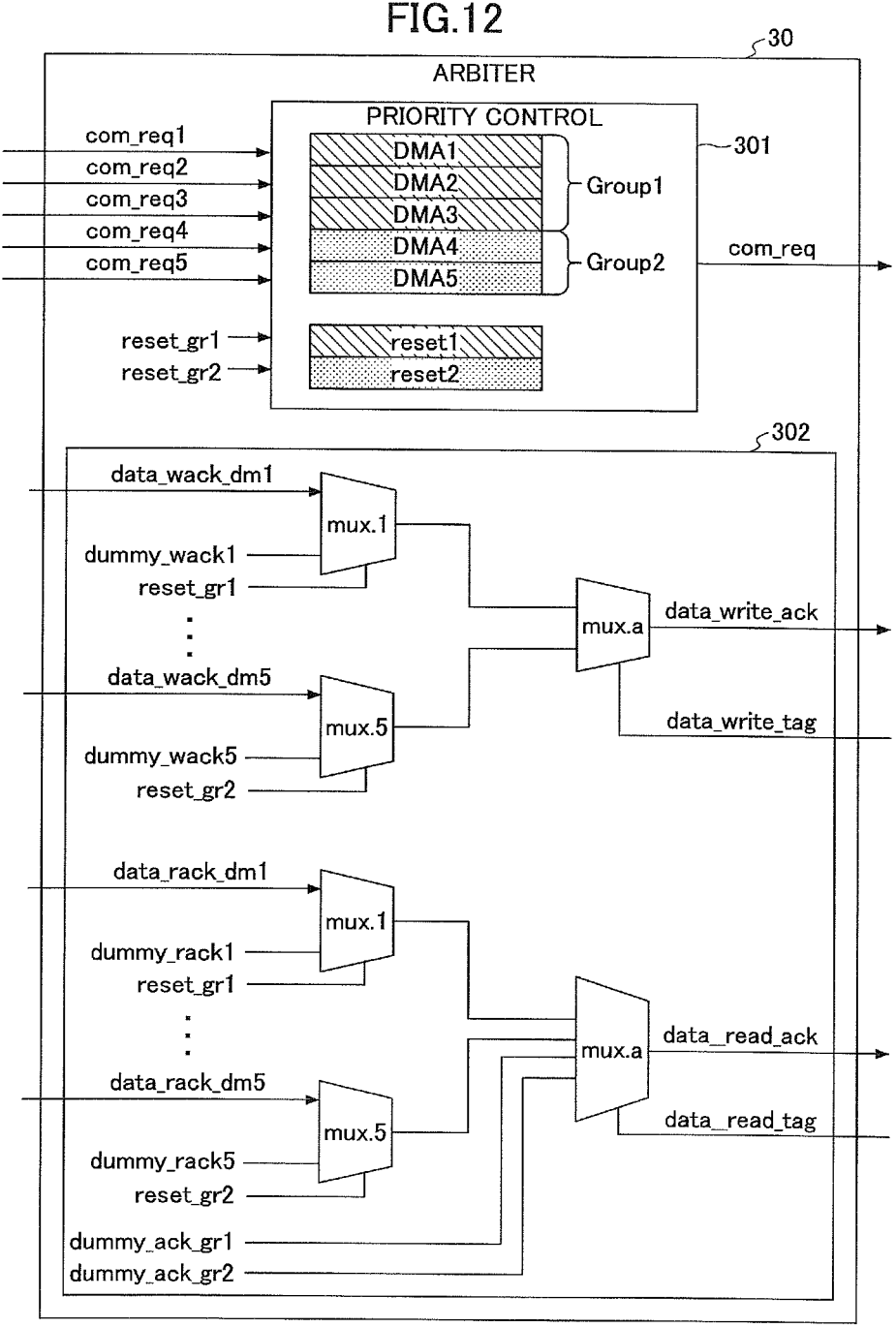
FIG. 12 shows a circuit configuration example of an arbiter 30 according to Embodiment 2.

FIG. 12 shows a major circuit configuration example of an arbiter 30 according to Embodiment 2. Referring to FIG. 12, the arbiter 30 includes a command issuing part 301 and a data receipt control part 302.

The command issuing part 301 receives command requests com_req*(*=1, 2, . . . , 5) from DMACs 1 to 5, chooses the request by determining priorities of the commands, and issues the command com_req to the DRAMC 15. In an example shown in FIG. 12, the DMACs 1 to 3 are classified into a group 1 and the DMACs 4 and 5 are classified in to a group 2. One example of a measure to determine the priorities is to provide an order of the priorities to the groups and determine the order of the priorities group by group.

Further, the command issuing part 301 issues a reset command corresponding to reset_gr* (*=1, 2) indicative of a group-by-group resetting.

The command issuing part 301 controls so that the priority of the command corresponding to the request for resetting one of the groups is set lower than the priorities of the commands issued by all groups including the DMACs 1 to 5. Therefore, the command corresponding to the request for resetting is sent to the DRAMC 15 after all of the commands are issued. Further, the priority of the command corresponding to the request for resetting may be set lower than the priority of the commands issued by the DMACs included in the group, to which the request for resetting is issued. Accordingly, it is possible to shorten a time necessary for the resetting.

The data receipt controlling part 302 controls to receive data. In a case where the command is a write request, a completion signal (data_wack_dm*(*=1, 2, . . . , 5) signal) indicating that write data from the DMACs 1 to 5 are completely acquired and a dummy completion signal (dummy_wack*(*=1, 2, . . . , 5) signal) which is generated at a time of resetting the group in the arbiter 30 are chosen upon receipt of the request for resetting (reset_gr*(*=1, 2, . . . , n)).

Specifically, the dummy completion signal (dummy_wack* signal) is chosen when the request for resetting is issued, and the completion signal (data_wack_dm* signal) is chosen when the request for resetting is not issued.

Next, the data receipt controlling part 302 chooses the signals thus chosen by a tag (data_write_tag) returned by the DRAMC 15 and outputs a completion signal (data_write_ack signal) to the DRAMC 15.

In a case where the command is a read request, a completion signal (data_rack_dm*(*=1, 2, . . . , 5) signal) indicating that data are completely received by the DMACs 1 to 5 and a dummy completion signal (dummy_rack*(*=1, 2, . . . , 5) signal) which is generated at a time of resetting the group in the arbiter 30 are chosen upon receipt of the request for resetting (reset_gr*(*=1, 2, . . . , n)).

Specifically, the dummy completion signal (dummy_rack* signal) is chosen when the request for resetting is issued, and the completion signal (data_rack_dm* signal) is chosen when the request for resetting is not issued.

Next, the data receipt controlling part 302 chooses the signals thus chosen by a tag (data_read_tag) returned by the DRAMC 15 and outputs a completion signal (data_read_ack signal) to the DRAMC 15.

Further, in case of the read request, a circuit for generating the data_read_ack receives response signals dummy_ack_gr1 and dummy_ack_gr2 for receiving data for pseudo read carried out at a time of issuing the reset_gr*.

<Process for Resetting>

Figure 13:
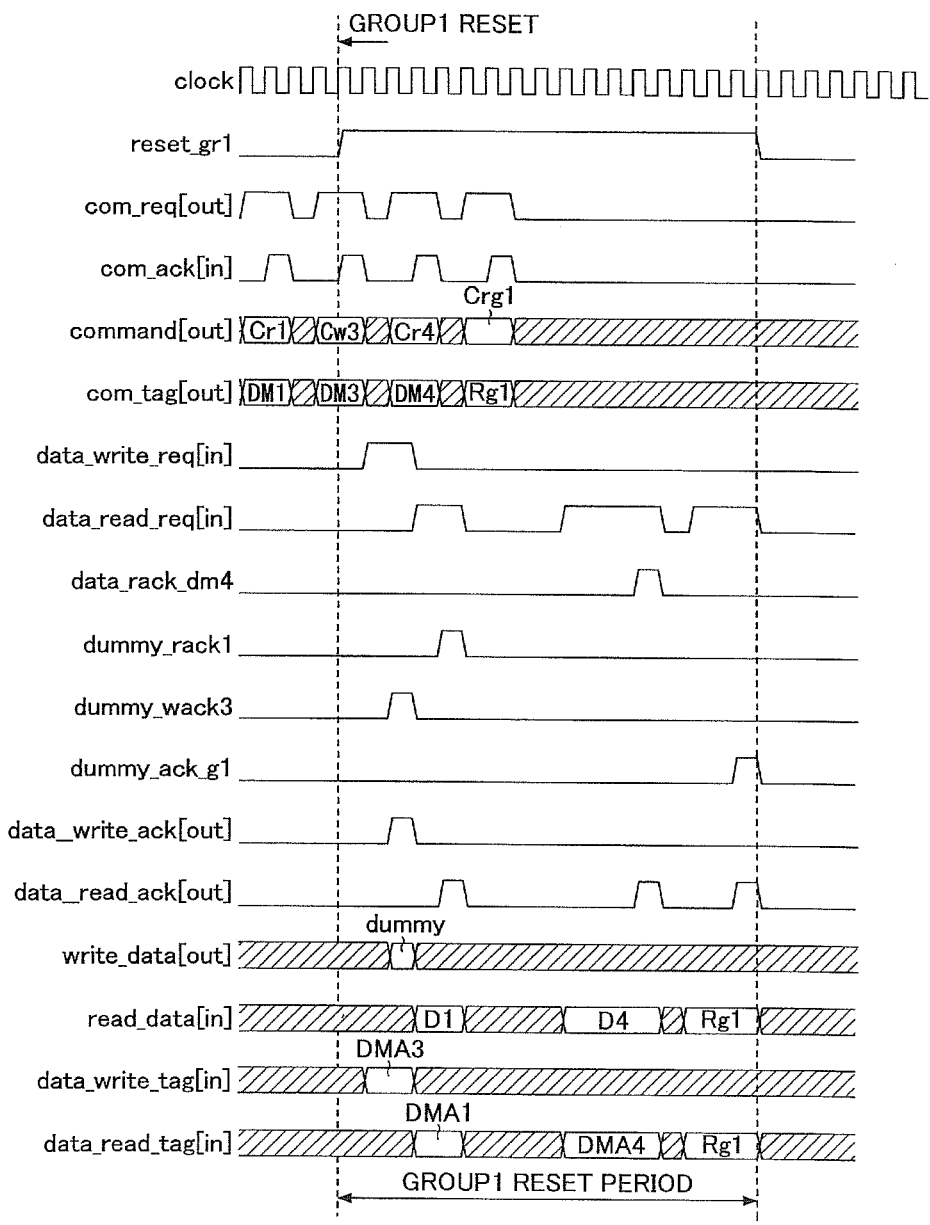
FIG. 13 shows an example of a timing chart for a process for resetting according to Embodiment 2.

FIG. 13 shows an example of a timing chart for a process for resetting according to Embodiment 2. Referring to FIG. 13, DMAC 1 issues a command corresponding to a read request, DMAC 3 issues a command corresponding to a write request, and DMAC 4 issues a command corresponding to a read request.

Assuming that the group 1 is reset at a timing of issuing the write command from the DMAC 3, the reset_gr1 is asserted and makes the DMACs included in the group 1 unable to output a response signal.

Next, a command phase will be explained. When the group 1 is subject to resetting, a priority of a command "Crg1" corresponding to the resetting of the group 1 becomes the lowest order and therefore is issued at the end. At this time, a tag "Rg1" is allocated to the command "Crg1". Next, a data phase will be explained. The arbiter 30 cannot output a response signal when the arbiter 30 receives a write request (data_write_req) from the DRAM 15 because the DMAC 3 indicated by a tag "DMA" is included in the group 1 subject to resetting. The arbiter 30 can output dummy data to the DRAM 15 by issuing a dummy completion signal (dummy_wack3) as a response signal.

Next the arbiter 30 receives read data "D1" from the DRAMC 15 along with a tag "DMA 1". However, since the DMAC 1 indicated by the tag "DMA 1" is included in the group 1 subject to the resetting, the DMAC 1 cannot output a response signal. Accordingly, the arbiter 30 issues a dummy completion signal (dummy_rack1) to the DRAMC 15 as a response signal, thereby enabling to receive data "D1" instead of the DMAC 1. The data "D1" are discarded.

Next, the arbiter 30 receives read data "D4" from the DRAMC 15 along with a tag "DMA 4". Since the DMAC 4 indicated by the tag "DMA 4" is included in the group 2 which is not subject to the resetting, the data "D4" are acquired thereby enabling to output a response signal (data_rack_dm4).

Next, the arbiter 30 acquires the tag "Rg1" along with data "Rg1" from the DRAMC 15. However, since there is no DMAC indicated by the tag "Rg1", a response signal of dummy_ack_g1 is generated and the data "Rg1" are acquired and discarded.

At this time, because the arbiter 30 can determine that there are no data transfers for the other commands, the arbiter 30 resets the DMACs in the group 1. Specifically, by negating the reset_gr1, the process for resetting the group 1 is completed.

According to the data transfer device of the Embodiment 2, the arbiter 30 sets the priority of the command corresponding to the request for resetting lower than the priorities of the commands issued by the data transfer control units (the DMACs) in a case where the request for resetting is issued to the DMACs. Further, when a data transfer is requested to be performed by the data transfer control units included in the group subject to the request, the dummy completion signal is output. Therefore, it is possible to output the response signal from the data transfer control unit included in the group subject to the request for resetting, thereby enabling to continue the data transfer without affecting other data transfer control units.

Further, the processes explained in the above embodiments may be written as a program for a computer to execute to carry out these processes to thereby embody the processes by the computer included in the data transfer device. Furthermore, the program may be recorded into a recording medium to enable the computer to read out the program for executing the above-described processes with the data transfer device.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made thereto without departing from the spirit and scope of the invention.

This patent application is based on Japanese Priority Patent Application No. 2008-302905 filed on Nov. 27, 2008, the entire contents of which are hereby incorporated herein by reference.

What is claimed is:

1. A data transfer device comprising:
   one or more data transfer control units configured to control a command issuance and a data transfer separately;
   a command issuing unit configured to determine priorities of commands and issue the commands in an order from a higher priority;
   a memory communication control unit configured to carry out the data transfer, corresponding to the commands thus issued from the command issuing unit, from and to a memory; and
   a signal output unit configured to output a completion signal indicative of a completion of the data transfer controlled by one of the data transfer control units, in a case where the data transfer is normally completed, in response to a data transfer request, from the memory communication control unit, for the data transfer controlled by the one of the data transfer control units,
   wherein a data transfer control unit amongst the data transfer control units issues a request for resetting itself, the request for resetting coming after the command issuance by the data transfer control unit and prior to the data transfer by the data transfer control unit, the command issuing unit issues a pseudo command corresponding to the request for resetting and having a priority lower than a priority of commands issued by the remaining data transfer control units which have not issued a request for resetting, and
   wherein in a case that the request for resetting the data transfer control unit is received when the data transfer control unit has issued a read command, the signal output unit outputs a dummy completion signal to the memory communication control unit, and the memory communication control unit, in response to the dummy completion signal, discards data read from the memory in response to the read command.

2. The data transfer device according to claim 1, further comprising: a discarding unit configured, in a case where the command is a read request, to discard data read from the memory upon the read request when a destination to which the data is to be transferred is the data transfer control unit subject to the request for resetting.

3. The data transfer device according to claim 1, further comprising: a dummy data output unit configured, in a case where the command is a write request, to output dummy data to the memory communication control trait when the data transfer control unit which issues the write request is subject to the request for resetting before write data are acquired from the data transfer control unit which issues the write request.

4. The data transfer device according to claim 1, further comprising: an allocating unit configured to allocate a tag indicative of the data transfer control unit issuing the command, in response to the command and to allocate a reset tag indicative of the data transfer control unit subject to the request for resetting, in response to the request for resetting.

5. The data transfer device according to claim 1, wherein the priority of the command corresponding to the request for resetting is set by the command issuing unit to be lower than the priorities of the commands respectively issued by the data transfer control units only in a case where the request for resetting the data transfer control units is issued before a completion of the data transfer in response to the command issued by the data transfer control unit.

6. The data transfer device according to claim 1, wherein the priority of the command corresponding to the request for resetting is set by the command issuing unit to be lower than the priority of the command issued by the data transfer control unit subject to the request for resetting.

7. The data transfer device according to claim 1, wherein the data transfer control units are classified into a plurality of groups, in a case where the group of the data transfer control units are subject to the request for resetting, the priority of the command corresponding to the request for resetting is set by the command issuing unit to be lower than the priorities of the commands respectively issued by the data transfer control units in the group, the signal output unit outputs the dummy completion signal to the memory communication control unit as a response signal in response to the data transfer request by the group of the data transfer control units subject to the request for resetting.

8. A data transfer method in a data transfer device including one or more data transfer control units configured to control a command issuance and a data transfer separately, a command issuing unit configured to determine priorities of commands and issue the commands in an order from a higher priority, a memory communication control unit configured to carry out the data transfer corresponding to the commands thus issued from the command issuing unit from and to a memory, and a signal output unit configured to output a completion signal indicative of a completion of the data transfer with one of the data transfer control units in response to a request for the data transfer from the memory communication control unit in a case where the data transfer is normally completed, the data transfer method comprising:
   receiving, from a data transfer control unit amongst the data transfer control units, a request for resetting said data transfer control unit, the request for resetting coming after the command issuance by the data transfer control unit and prior to data transfer by the data transfer control unit;
   (a) issuing, by the command issuing unit, a pseudo command corresponding to the request for resetting and having a priority to be lower than a priority of each of other commands issued by the remaining data transfer control units which have not issued a request for resetting; and
   (b) outputting by the signal output unit, when the request for resetting the data transfer control unit is received, a dummy completion signal to the memory communication control unit; and
   (c) discarding by the memory communication control unit, in a case that the request for resetting the data transfer control unit is received when the data transfer control unit has issued a read command, data read from the memory in response to the read command.

9. The data transfer method according to claim 8, further comprising: discarding with a discarding unit, in a case where the command is a read request and a destination to which data is to be transferred is the data transfer control unit subject to the request for resetting, the data read from the memory upon the read request.

10. The data transfer method according to claim 8, further comprising: outputting with a dummy data outputting unit, in a case where the command is a write request and the data transfer control unit is subject to the request for resetting before write data are acquired from the data transfer control unit, dummy data to the memory communication control unit.

11. The data transfer method according to claim 8, further comprising: allocating with an allocating unit a tag indicative of the data transfer control unit issuing the command in response to the command; and allocating with the allocating unit a reset tag indicative of the data transfer control unit subject to the request for resetting, in response to the request for resetting.

12. The data transfer method according to claim 8, wherein the priority of the command corresponding to the request for resetting the data transfer control unit is set in (a) with the command issuing unit to be lower than the priority of the command issued by the data transfer control unit when the request for resetting is received, only in a case where the request for resetting the data transfer control unit is issued before a completion of the dam transfer in response to the command issued by the data transfer control unit.

13. The data transfer method according to claim 8, wherein the priority of tile command corresponding to tile request for resetting the data transfer control unit is set in (a) with the command issuing unit to be lower than the priority of the command issued by the data transfer control unit when the request for resetting is received, to make the priority of the command corresponding to the request for resetting one of the data transfer control units, to be lower than the priority of the command issued by the one of the data transfer control units.

14. The data transfer method according to claim 8, wherein the data transfer control units are classified into a plurality of groups, the priority of the command corresponding to the request for resetting the data transfer control unit is set in (a) with the command issuing unit to be lower than the priority of the command issued by the data transfer control unit when the request for resetting is received is carried out, in a case where the group of the data transfer control units is subject to the request for resetting, to set the priority of the command corresponding to the request for resetting, to be lower than the priorities of the commands respectively issued by the data transfer control units in the group, and the outputting with the signal output unit the dummy completion signal to the memory communication control unit as the response signal in response to the data transfer request by the data transfer control unit subject to the request for resetting is carried out in response to the data transfer request by the group of the data transfer control units subject to the request for resetting.

15. A non-transitory computer-readable storage medium storing a program for causing a computer to execute a method of transferring data, the method comprising:
(a) controlling a command issuance and a data transfer separately;
(b) determining priorities of commands and issuing the commands in an order from a higher priority;
(c) carrying out data transfers corresponding to the commands issued in (b), from and to a memory; and
(d) outputting a completion signal indicative of a completion of a data transfer controlled by a data transfer control unit, in a case that the data transfer is normally completed, in response to a request for the data transfer,
wherein a priority of a pseudo command corresponding to a request for resetting the data transfer control unit, the request for resetting coming after the command issuance and prior to the data transfer, is set to be lower than a priority of each of other commands to be issued in (b), and wherein the method further comprises:
(e) discarding by the memory communication control unit, in a case that the request for resetting the data transfer control unit is received when the data transfer control unit has issued a read command, data read from a memory in response to the read command.

16. The data transfer method according to claim 8, further comprising: (d) outputting dummy data, by a dummy data output unit, to the memory communication control unit, when the request for resetting the data transfer control unit is received; and (e) discarding by the memory communication control unit the dummy data received from the dummy data output unit.

17. The data transfer device according to claim 1, further comprising: a dummy data output unit configured to generate dummy data, wherein when the request for resetting the data transfer control unit is received, the dummy data output unit outputs the dummy data to the memory communication control unit, and wherein when the memory communication control unit receives the dummy data, the memory communication control unit discards the received dummy data.

* * * * *